US012140955B2

(12) United States Patent
Li

(10) Patent No.: US 12,140,955 B2
(45) Date of Patent: Nov. 12, 2024

(54) EDGEWISE PATH SELECTION METHOD FOR ROBOT OBSTACLE CROSSING, CHIP, AND ROBOT

(71) Applicant: AMICRO SEMICONDUCTOR CO., LTD., Guangdong (CN)

(72) Inventor: Ming Li, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 56 days.

(21) Appl. No.: 17/771,021

(22) PCT Filed: Nov. 24, 2020

(86) PCT No.: PCT/CN2020/131190
§ 371 (c)(1),
(2) Date: Apr. 22, 2022

(87) PCT Pub. No.: WO2022/000961
PCT Pub. Date: Jan. 6, 2022

(65) Prior Publication Data
US 2023/0114211 A1 Apr. 13, 2023

(30) Foreign Application Priority Data

Jun. 30, 2020 (CN) .......................... 202010614362.5

(51) Int. Cl.
G05D 1/00 (2024.01)
(52) U.S. Cl.
CPC ......... G05D 1/0214 (2013.01); G05D 1/0227 (2013.01)
(58) Field of Classification Search
CPC .. G05D 1/0214; G05D 1/0227; G05D 1/0217; G05D 1/0274; A47L 2201/04;
(Continued)

(56) References Cited

U.S. PATENT DOCUMENTS 5,363,305 A * 11/1994 Cox ...................... G05D 1/0234
701/461
5,502,638 A * 3/1996 Takenaka ............. G05D 1/0274
701/87
(Continued)

FOREIGN PATENT DOCUMENTS

CN 102063123 5/2011
CN 106647739 5/2017
(Continued)

OTHER PUBLICATIONS

The EESR of family EP patent application No. 20942867.1 issued on Oct. 14, 2022.
(Continued)

*Primary Examiner* — Bhavesh V Amin
(74) *Attorney, Agent, or Firm* — Samson G. Yu

(57) ABSTRACT

An edgewise path selection method for robot obstacle crossing, a chip, and a robot. The method includes: first, planning an edgewise prediction paths for the robot obstacle crossing, and selecting, on a navigation path which is preset, preset inflection points satisfying a guide condition, and the navigation path formed by connecting inflection points is preset for the robot; the inflection points are used for guiding the robot to move to a final navigation target point; then according to information of distances between all the edgewise behavior points on each of the edgewise prediction path, and the preset inflection points satisfying the guide condition on one same navigation path, selecting one edgewise prediction path having a minimum deviation degree relative to the navigation path, so that the robot walks in an edgewise direction of the edgewise prediction path which is selected after colliding with an obstacle.

19 Claims, 3 Drawing Sheets

(58) Field of Classification Search
CPC ...... A47L 11/4011; A47L 11/24; A47L 11/40; A47L 11/4002; A47L 11/4061; A47L 9/2852
See application file for complete search history.

(56) References Cited

U.S. PATENT DOCUMENTS

| | | | | |
|---|---|---|---|---|
| 5,548,511 | A * | 8/1996 | Bancroft | G05D 1/0242 15/340.1 |
| 5,896,488 | A * | 4/1999 | Jeong | G05D 1/0229 318/587 |
| 8,234,032 | B2 * | 7/2012 | Lee | G05D 1/0214 701/25 |
| 8,234,068 | B1 * | 7/2012 | Young | G08G 5/0069 701/410 |
| 8,849,559 | B2 * | 9/2014 | Jeong | G06T 19/003 701/411 |
| 9,026,301 | B2 * | 5/2015 | Zini | G06K 19/0723 901/1 |
| 9,227,632 | B1 * | 1/2016 | Lee | B60W 30/0956 |
| 9,229,453 | B1 * | 1/2016 | Lee | B60W 30/12 |
| 10,394,234 | B2 * | 8/2019 | Salour | G05D 1/0234 |
| 10,816,993 | B1 * | 10/2020 | Tran | G05D 1/0246 |
| 10,852,745 | B2 * | 12/2020 | Jeon | G05D 1/0088 |
| 11,014,236 | B2 * | 5/2021 | Tang | G05D 1/0238 |
| 11,480,974 | B2 * | 10/2022 | Lee | G05D 1/0246 |
| 11,829,147 | B2 * | 11/2023 | Sampaio Martins Pereira | A47L 9/2826 |
| 2007/0027579 | A1 * | 2/2007 | Suzuki | G05D 1/0251 700/245 |
| 2007/0047940 | A1 * | 3/2007 | Matsumoto | G01C 25/00 396/106 |
| 2007/0058838 | A1 * | 3/2007 | Taniguchi | G06V 20/10 382/106 |
| 2007/0276541 | A1 * | 11/2007 | Sawasaki | G05D 1/0246 700/253 |
| 2007/0282531 | A1 * | 12/2007 | Park | G05D 1/0253 701/23 |
| 2008/0294338 | A1 * | 11/2008 | Doh | G05D 1/0234 901/1 |
| 2009/0055020 | A1 * | 2/2009 | Jeong | G05D 1/0274 901/50 |
| 2009/0234527 | A1 * | 9/2009 | Ichinose | G05D 1/024 701/23 |
| 2009/0292393 | A1 * | 11/2009 | Casey | G05D 1/0255 700/245 |
| 2010/0121488 | A1 * | 5/2010 | Lee | G05D 1/0274 700/245 |
| 2010/0121517 | A1 * | 5/2010 | Lee | G05D 1/0214 701/25 |
| 2010/0198443 | A1 * | 8/2010 | Yabushita | G05D 1/0274 701/25 |
| 2011/0010083 | A1 * | 1/2011 | Lee | G05D 1/0274 701/532 |
| 2011/0054689 | A1 * | 3/2011 | Nielsen | G05D 1/0214 700/258 |
| 2011/0098874 | A1 * | 4/2011 | Choi | G05D 1/0274 901/1 |
| 2011/0137461 | A1 * | 6/2011 | Kong | G05D 1/0274 901/1 |
| 2011/0153137 | A1 * | 6/2011 | Yeom | G05D 1/0274 701/25 |
| 2012/0189507 | A1 * | 7/2012 | Ko | A47L 11/4036 261/78.2 |
| 2012/0239191 | A1 * | 9/2012 | Versteeg | G06N 3/004 901/1 |
| 2015/0032259 | A1 * | 1/2015 | Kim | G08G 1/16 700/255 |
| 2016/0088755 | A1 * | 3/2016 | Lee | A47L 11/4094 901/1 |
| 2016/0125612 | A1 * | 5/2016 | Seki | G06V 20/20 382/106 |
| 2016/0357187 | A1 * | 12/2016 | Ansari | G08G 1/165 |
| 2016/0357188 | A1 * | 12/2016 | Ansari | G05D 1/0274 |
| 2016/0357262 | A1 * | 12/2016 | Ansari | B60H 1/00742 |
| 2016/0358477 | A1 * | 12/2016 | Ansari | B60W 60/0059 |
| 2017/0131721 | A1 * | 5/2017 | Kwak | G05D 1/0044 |
| 2017/0329347 | A1 * | 11/2017 | Passot | A47L 11/4061 |
| 2017/0332868 | A1 * | 11/2017 | Nam | A47L 9/1691 |
| 2018/0084708 | A1 * | 3/2018 | Neitemeier | A01B 69/001 |
| 2018/0149482 | A1 * | 5/2018 | Guo | G01C 21/206 |
| 2018/0222486 | A1 * | 8/2018 | Schroeder | G08G 1/00 |
| 2018/0304468 | A1 * | 10/2018 | Holz | B25J 9/1697 |
| 2018/0364349 | A1 * | 12/2018 | Kudrynski | G01S 19/42 |
| 2019/0310653 | A1 * | 10/2019 | Lee | G05D 1/0246 |
| 2019/0314987 | A1 * | 10/2019 | Tang | A47L 11/24 |
| 2020/0097006 | A1 * | 3/2020 | Liu | G07C 5/085 |
| 2020/0290742 | A1 * | 9/2020 | Kumar | B64D 35/024 |
| 2021/0116911 | A1 * | 4/2021 | Pjevach | B60L 50/66 |
| 2021/0129335 | A1 * | 5/2021 | Liss | B25J 9/1676 |

FOREIGN PATENT DOCUMENTS

| | | |
|---|---|---|
| CN | 108241370 | 7/2018 |
| CN | 108508891 | 9/2018 |
| CN | 109238298 A | 1/2019 |
| CN | 109464075 A | 3/2019 |
| CN | 109871021 | 6/2019 |
| CN | 110231824 A | 9/2019 |
| CN | 1110442125 A | 11/2019 |
| CN | 110609547 | 12/2019 |
| CN | 111090282 A | 5/2020 |
| CN | 111176282 | 5/2020 |
| CN | 111273647 A | 6/2020 |
| CN | 111338352 A | 6/2020 |
| CN | 111938513 A | 11/2020 |
| EP | 3611590 A1 | 2/2020 |
| JP | H05150833 | 6/1993 |
| JP | 201958803 A | 4/2019 |
| JP | 2019521401 A | 7/2019 |
| WO | 2016174786 A1 | 11/2016 |

OTHER PUBLICATIONS

The 2nd office action of family JP patent application No. 2022-539184 issued on Jan. 30, 2024.

* cited by examiner

EDGEWISE PATH SELECTION METHOD FOR ROBOT OBSTACLE CROSSING, CHIP, AND ROBOT

CROSS-REFERENCE TO RELATED APPLICATION

The present disclosure claims the priority of Chinese Patent Application No. 202010614362.5, filed to the China National Intellectual Property Administration on Jun. 30, 2020 and entitled "Edgewise Path Selection Method for Robot Obstacle Crossing, Chip, and Robot", which is incorporated herein its entirety by reference.

TECHNICAL FIELD

The disclosure relates to the technical field of obstacle crossing performed by a robot along an edge, and in particular, to an edgewise path selection method for robot obstacle crossing, a chip, and a robot.

BACKGROUND

Robot navigation controlling is to control a robot to walk from one coordinate point of a map to another coordinate point. Generally, a path is first searched from the map, and then the robot walks according to the path, until the robot reaches a target point. However, in a conventional visual sweeping robot, due to factor impacts that the precision of the map is not high enough, the marking of a map obstacle is not accurate enough, and the robot cannot accurately walk according to a navigation path during navigation, as a result, the robot easily collides with an obstacle during navigation.

Currently, how to quickly overcome these obstacles by finding a correct direction has always been a difficult point in the process of robot navigation.

SUMMARY

The disclosure discloses an edgewise path selection method for robot obstacle crossing. A specific technical solution includes as follows.

An edgewise path selection method for robot obstacle crossing includes: first, planning an edgewise prediction path for the robot obstacle crossing, and selecting, on a navigation path which is preset, preset inflection points satisfying a guide condition, and the navigation path formed by connecting inflection points is preset for the robot; the inflection points are used for guiding the robot to move to a final navigation target point; then according to information of distances between all of edgewise behavior points on each of the edgewise prediction path and the preset inflection points satisfying the guide condition on one same navigation path, selecting one edgewise prediction path having a minimum deviation degree relative to the navigation path, to cause the robot to walk in an edgewise direction of the edgewise prediction path which is selected after colliding with an obstacle.

Further, selecting, on the navigation path which is preset, the preset inflection points satisfying the guide condition includes: selecting a target inflection point on the navigation path, and then judging whether the target inflection point and one or two of the inflection points successively arranged along a navigation forward direction of the navigation path from the target inflection point have the final navigation target point, to select the preset inflection point satisfying the guide condition, and the navigation forward direction of the navigation path is a robot navigation direction for guiding the robot to move to the final navigation target point, and the final navigation target point is a termination point of the navigation path, and also belongs to one of the inflection points of the navigation path.

Further, when judging the two of the inflection points successively arranged along the navigation forward direction of the navigation path from the target inflection point do not have the final navigation target point, determining the preset inflection point satisfying the guide condition includes: the target inflection point, and two of the inflection points successively arranged along the navigation forward direction of the navigation path from the target inflection point on the navigation path; when judging a first inflection point or a second inflection point successively arranged along the navigation forward direction of the navigation path from the target inflection point is the final navigation target point, determining the preset inflection point satisfying the guide condition includes: all of the inflection points that are arranged along the navigation forward direction of the navigation path from the target inflection point to the final navigation target point on the navigation path; the target inflection point and the final navigation target point are also included; the first inflection point is adjacent to the target inflection point in the navigation forward direction of the navigation path, and the second inflection point is adjacent to the first inflection point in the navigation forward direction of the navigation path; and when judging the target inflection point selected on the navigation path is the final navigation target point, determining the preset inflection point satisfying the guide condition has only the final navigation target point.

Further, selecting the target inflection point on the navigation path which is preset specifically includes: establishing an inflection point comparison area composed of grid coordinates that use the current position of the robot as a center and a maximum distance from the current position of the robot as a first preset distance threshold value; when the inflection point comparison area only has one of the inflection point, selecting and recording the one of the inflection point as the target inflection point; when the inflection point comparison area has two or more than two of the inflection points, in the inflection points with distances from the current position of the robot being less than the first preset distance threshold value, selecting and recording one inflection point that is closest to the final navigation target point in the navigation forward direction of the navigation path as the target inflection point; when the inflection point comparison area has none of the inflection points, along the navigation forward direction of the navigation path, selecting and recording one inflection point that is adjacent to the target inflection point recently marked by the robot on the navigation path as the target inflection point which is new; and when a distance between the current position of the robot and one of the inflection points is less than a second preset distance threshold value, determining the current position of the robot is coincide with the inflection point; and the second preset distance threshold value is less than the first preset distance threshold value.

Further, according to the information of the distances between all of the edgewise behavior points on each of the edgewise prediction path and the preset inflection points satisfying the guide condition on the same navigation path, selecting the edgewise prediction path having the minimum deviation degree relative to the navigation path, to cause the robot to walk in the edgewise direction of the edgewise prediction path which is selected after colliding with the obstacle so as to achieve the obstacle crossing includes: the edgewise prediction path including a left edgewise prediction path and a right edgewise prediction path, and an edgewise direction of the left edgewise prediction path being opposite to an edgewise direction of the right edgewise prediction path; calculating distances between the preset inflection points satisfying the guide condition of the navigation path and a same edgewise behavior point on the left edgewise prediction path, summing the distances to obtain a left local distance sum generated by the edgewise behavior point relative to the preset inflection points satisfying the guide condition; then repeating a foregoing calculation step to obtain left local distance sums generated by each of the edgewise behavior point relative to the preset inflection points satisfying the guide condition, and then adding the left local distance sums, to acquire a total sum of left distances generated by the left edgewise prediction path relative to the preset inflection points satisfying the guide condition, for indicating a deviation degree of the left edgewise prediction path relative to the navigation path; meanwhile, calculating distances between the preset inflection points satisfying the guide condition of the navigation path and a same edgewise behavior point on the right edgewise prediction path, summing the distances to obtain a right local distance sum generated by the edgewise behavior point relative to the preset inflection points satisfying the guide condition; then repeating a foregoing calculation step to obtain right local distance sums generated by each of the edgewise behavior point relative to the preset inflection points satisfying the guide condition, and then adding the right local distance sums, to acquire a total sum of right distances generated by the right edgewise prediction path relative to the preset inflection points satisfying the guide condition, for indicating a deviation degree of the right edgewise prediction path relative to the navigation path; when the total sum of the left distances is greater than the total sum of the right distances, determining that the right edgewise prediction path is the edgewise prediction path with the minimum deviation degree relative to the navigation path, and selecting the right edgewise prediction path, to cause the robot, after colliding with the obstacle, to walk according to the edgewise direction of the right edgewise prediction path which is selected to achieve the obstacle crossing; and when the total sum of the right distances is greater than the total sum of the left distances, determining that the left edgewise prediction path is the edgewise prediction path with the minimum deviation degree relative to the navigation path, and selecting the left edgewise prediction path, to cause the robot, after colliding with the obstacle, to walk according to the edgewise direction of the left edgewise prediction path which is selected to achieve the obstacle crossing, and, the smaller the total sum of the right distances, the smaller the deviation degree of the right edgewise prediction path relative to the navigation path; and the smaller the total sum of the left distances, the smaller the deviation degree of the left edgewise prediction path relative to the navigation path.

Further, the navigation path is formed by connecting a set of the inflection points that are orderly distributed, and on the navigation path, planned serial numbers of the inflection points arranged along the navigation forward direction of the navigation path increase sequentially, and the planned serial numbers of the preset inflection points satisfying the guide condition increases sequentially, the inflection points of which the planned serial numbers are less than the planned serial number of the target inflection point is recorded as the inflection points which are traversed by the robot, and the planned serial number of the final navigation target point is the greatest, to cause the planned serial numbers corresponding to the inflection points that are closer to the final navigation target point in the navigation forward direction of the navigation path to be greater.

Further, the method further includes: after the robot starts walking according to the navigation path, judging, within a preset time, whether a variation of a coordinate position where the robot is located is greater than a distance stabilization threshold value, if the variation of the coordinate position where the robot is located is greater than the distance stabilization threshold value, controlling the robot to plan the edgewise prediction path, if the variation of the coordinate position where the robot is located is not greater than the distance stabilization threshold value, controlling the robot to change the edgewise direction, to cause the robot to walk in a direction opposite to the edgewise direction which is currently determined, the edgewise direction which is currently determined including a preset edgewise direction when the robot is powered on and an edgewise direction of the edgewise prediction path that is selected last time and has the minimum deviation degree relative to the navigation path; and controlling the robot to walk in the direction opposite to the edgewise direction which is currently determined if it is determined that two edgewise prediction paths which are used for the robot obstacle crossing and have opposite edgewise directions are unable to be planned, and the distance stabilization threshold value is set to a diameter of a body of the robot.

Further, planning the edgewise prediction path includes: step 1, after the robot currently collides with the obstacle, marking a collision point on a grid map with pre-marked obstacle information; step 2, selecting grids meeting an edgewise obstacle-crossing condition on a neighborhood of the collision point currently marked in the step 1, and marking the grids which is selected as the edgewise behavior points configured to cause the robot to walk along an edge of the obstacle, to cause the edgewise behavior points to form the edgewise prediction path.

Further, the step 2 specifically includes: step 21, searching obstacle points of which distance relationship with the collision point currently marked in the step 1 meets a closest distance condition; step 22, searching the grids meeting a pre-edgewise condition on a neighborhood of the obstacle points searched in the step 21; step 23, when a number of the grids meeting the pre-edgewise condition is counted to reach a second preset grid number, selecting grids meeting an optimal edgewise condition from the grids meeting the pre-edgewise condition as the grids meeting the edgewise obstacle-crossing condition; and step 24, marking the grids meeting the optimal edgewise condition and selected in the step 23 as a new collision point, adding the new collision point as a edgewise behavior point which is newly planned on the edgewise prediction path correspondingly configured to cause the robot to walk along the edge of the obstacle, and meanwhile, updating the new collision point as the collision point currently marked in the step 1, and then returning to perform the step 21, until the edgewise behavior points of a preset obstacle-crossing grid number are marked, and when the obstacle points meeting the closest distance condition are not searched out in the step 21, it is determined that the edgewise prediction path is unable to be planned; alternatively, when the grids meeting the pre-edgewise condition are not searched out in the step 22, it is determined that the edgewise prediction path is unable to be planned.

Further, in the step 23, the grid meeting the optimal edgewise condition includes: a grid whose connecting line with a current position of the robot is closest to the edge of the obstacle is selected from the grids meeting the pre-edgewise condition; and in a process of performing the edgewise path selection method, the current position of the robot is unchanged.

Further, the step 23 specifically includes: when a counting number of the grids meeting the pre-edgewise condition reaches the second preset grid number, selecting the grid whose connecting line with a current position of the robot is closest to the edge of the obstacle according to a relative position relationship between the grids meeting the pre-edgewise condition and the current position of the robot, to meet the edgewise obstacle-crossing condition.

Further, calculating the relative position relationship between the grids meeting the pre-edgewise condition and the current position of the robot includes: establishing a robot coordinate system by the current position of the robot as an original point, a right side direction of the body of the robot as an X-axis positive direction, and a current forward direction of the robot as a Y-axis positive direction, and the current position of the robot is equivalent to a map position of a center of the body of the robot is located; and in the robot coordinate system, respectively calculating a coordinate value and an angle value of each of the grid meeting the optimal edgewise condition relative to the original point of the robot coordinate system.

Further, the collision point includes a front collision point, a left collision point, and a right collision point; a left collision detector is disposed at a left front portion of the body of the robot and configured to detect the obstacle collided on a left side of a forward direction of the robot, so as to detect the obstacle collided by the left side of the body when the robot walks counterclockwise along the edge of the obstacle, and mark a collision point on the obstacle in a corresponding direction as the left collision point; a right collision detector is disposed at a right front portion of the body of the robot and configured to detect the obstacle collided on a right side of the forward direction of the robot, so as to detect the obstacle collided by the right side of the body when the robot walks clockwise along the edge of the obstacle, and mark a collision point on the obstacle in the corresponding direction as the right collision point; the left collision detector and the right collision detector are symmetrically disposed on the left side and the right side of the body of the robot; when a front side of the robot collides with the obstacle, the left collision detector and the right collision detector are simultaneously triggered for detection, the collision point on the obstacle in a corresponding direction is marked as the front collision point, to cause the front collision point, the left collision point, and the right collision point of the robot marked in a same position to be located on a tangent line of a contour line of the obstacle collided with the front side of the robot; and the contour line of the obstacle is marked and formed on the grid map.

Further, selecting the grid whose connecting line with the current position of the robot is closest to the edge of the obstacle according to the relative position relationship between the grids meeting the pre-edgewise condition and the current position of the robot includes: when the collision point currently marked in the step 1 is the left collision point, selecting a grid that meets the pre-edgewise condition, is distributed counterclockwise along the edge of the obstacle relative to the current position of the robot, and has a maximum angle value relative to the current position of the robot as the grid meeting the optimal edgewise condition, to cause the grid meeting the optimal edgewise condition to be connected as the right edgewise prediction path, a reference edgewise direction of the robot along the edge being an counterclockwise direction; and when the collision point currently marked in the step 1 is the right collision point, selecting a grid that meets the pre-edgewise condition, is distributed clockwise along the edge of the obstacle relative to the current position of the robot, and has a minimum angle value relative to the current position of the robot as the grid meeting the optimal edgewise condition, to cause the grid meeting the optimal edgewise condition to be connected as the left edgewise prediction path, a reference edgewise direction of the robot along the edge being a clockwise direction.

Further, in the step 21, the obstacle points meeting the closest distance condition includes: searching an obstacle point that is closest to the collision point currently marked in the step 1 in a first preset searching area and is not marked as the collision point, and the first preset searching area is a grid area that is established by the collision point currently marked in the step 1 as a center and a maximum distance from the collision point currently marked in the step 1 as a first preset grid number; before the step 24 is performed, the collision point currently marked in the step 1 is a first collision point that is marked by the robot on the grid map with pre-marked obstacle points by performing the step 1; and after the step 24 is performed, the collision point currently marked in the step 1 is a new collision point that is marked by the robot in the step 24 that is performed latest.

Further, between the step 22 and the step 23, the method further includes: when the grid meeting the pre-edgewise condition is counted, calculating the relative position relationship between the grid meeting the pre-edgewise condition and the current position of the robot.

Further, in the step 22, the grid meeting the pre-edgewise condition includes: among 8 grids in the neighborhood of the obstacle points searched in the step 21, selecting grids traversed and marked by the robot except for the obstacle points and the edgewise behavior points planned by the step 24.

A chip, having a program code stored thereon, and, when the program code is performed by the chip, the above edgewise path selection method is implemented.

A robot, and a left collision detector is disposed at a left front portion of a body of the robot and configured to detect an obstacle collided on a left side of a forward direction of the robot, so as to detect the obstacle collided by the left side of the body when the robot walks counterclockwise along an edge of the obstacle; a right collision detector is disposed at a right front portion of the body of the robot and configured to detect an obstacle collided on a right side of the forward direction of the robot, so as to detect the obstacle collided by the right side of the body when the robot walks clockwise along an edge of the obstacle; the robot is provided with the chip according to claim 18; the chip is connected to the left collision detector and the right collision detector; and the robot is configured to perform the edgewise path selection method.

DETAILED DESCRIPTION OF THE EMBODIMENTS

Figure 1:
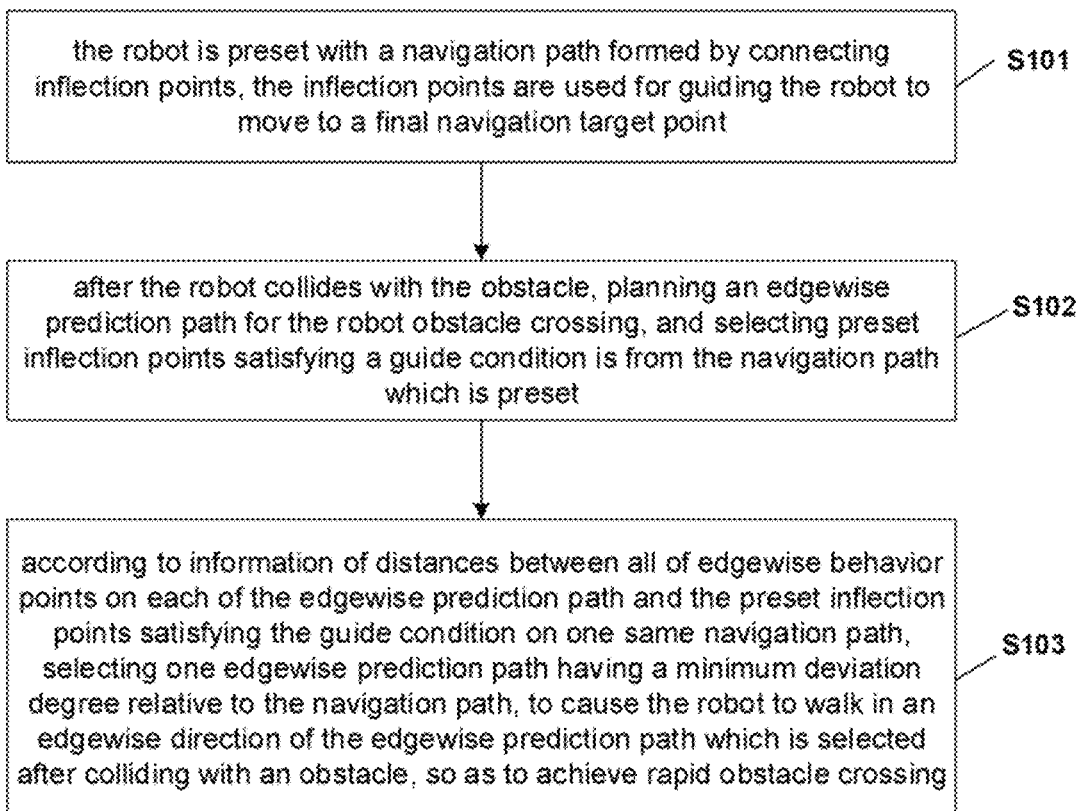
FIG. 1 is a flowchart of a basic conception of an edgewise path selection method for robot obstacle crossing according to an embodiment of the disclosure.

The technical solutions in embodiments of the disclosure will be described in detail below with reference to the drawings in the embodiments of the disclosure. In order to further describe the embodiments, the disclosure provides the drawings. These drawings are a part of the disclosure of the disclosure, which are mainly used for illustrating the embodiments, and can be used in conjunction with the relevant description of the specification to explain the operation principles of the embodiments. With reference to these contents, one of ordinary skill in the art shall understand other possible embodiments and advantages of the disclosure. Components in the drawings are not drawn to scale, and similar component symbols are often used to represent similar components.

In the patent for the disclosure, it is to be noted that, terms such as "up", "down", "left", "right", "front", "rear" and the like are orientation or position relationships shown in the drawings, are adopted not to indicate or imply that indicated devices or components must be in specific orientations or structured and operated in specific orientations but only to conveniently describe the disclosure and simplify descriptions and thus should not be understood as limits to the patent for the disclosure.

A robot can encounter different obstacles during the walking along an edge. In order to effectively simplify the description on indoor environments and put forward reasonable corresponding strategies during path planning, the following processing can be performed on an indoor obstacle. 1. As long as a distance between an obstacle and a wall does not meet a minimum distance that the robot passes through, and the robot cannot pass successfully, it is processed as a wall obstacle. 2. When a distance between two obstacles is very close and the robot cannot pass through, the two obstacles can be regarded as one obstacle for processing. 3. In the disclosure, a robot navigation area is mainly an indoor room area, the obstacle is an object that can collide with a mobile robot in the indoor room area, and a point that the mobile robot collides with the object is defined as a collision point.

An embodiment of the disclosure discloses an edgewise path selection method for robot obstacle crossing. As shown in FIG. 1, the method includes the following steps.

At step S101, the robot is preset with a navigation path formed by connecting inflection points, the inflection points are used for guiding the robot to move to a final navigation target point, and then step S102 is performed. The final navigation target point is a termination point of the navigation path, which is one of the inflection points of the navigation path. It is to be noted that, the navigation path has been calculated before the robot walks, and is formed by connecting a plurality of line segments in the grid map. The line segments intersect at the inflection points, so that the navigation path of the grid map can be described by using the inflection points. Therefore, during the advancing of the robot along the navigation path, the robot starts to traverse the next inflection point in the same navigation path from the current inflection point toward a navigation direction, until the robot advances to the final navigation target point.

At step S102, after the robot collides with the obstacle, planning an edgewise prediction path for the robot obstacle crossing, and selecting preset inflection points satisfying a guide condition is from the navigation path which is preset, and then step S103 is performed. The edgewise prediction path for the robot obstacle crossing includes two edgewise prediction paths with opposite edgewise directions, which respectively are a left edgewise prediction path and a right edgewise prediction path. Since a mode that the robot walks along the edge of the obstacle is classified into a left mode along the edge and a right mode along the edge, the robot under the left mode along the edge moves clockwise along the edge of the obstacle, and the robot under the right mode along the edge moves counterclockwise along the edge of the obstacle, when the robot starts walking along the edge, two edgewise prediction paths for robot obstacle crossing and having opposite edgewise directions along the edge are planned.

At step S103, according to information of distances between all of edgewise behavior points on each of the edgewise prediction path and the preset inflection points satisfying the guide condition on one same navigation path, selecting one edgewise prediction path having a minimum deviation degree relative to the navigation path, to cause the robot to walk in an edgewise direction of the edgewise prediction path which is selected after colliding with an obstacle, so as to achieve rapid obstacle crossing. In this embodiment, the navigation path which is preset is not related to the distribution of the obstacle. The preset inflection points of the navigation path are path nodes set by using the final navigation target point as the termination point. The preset inflection points satisfying the guide condition are used as reference quantities, and are used for determining and selecting the edgewise prediction path with the minimum deviation degree relative to the navigation path from candidate edgewise prediction paths that are planned in step S102. Then, the robot is controlled to walk according to the edgewise prediction path which is selected after colliding with the obstacle. However, a path along the edge that the robot actually walks is not necessarily performed according to a predicted plan. After all, there is a certain error in the predicted and planned path, and it can only show an approximate path and clarify a reasonable and feasible edgewise direction, for example, the robot walks clockwise or counterclockwise along the edge of the obstacle. Therefore, in this embodiment, after the robot collides with the obstacle, the robot can walk according to the edgewise direction of the edgewise prediction path to achieve rapid edgewise obstacle crossing.

It is to be noted that, the navigation path is designed before the robot starts navigation. In a process that the robot advances to the final navigation target point along the navigation path, the robot stops walking along the navigation path due to collision with the obstacle, then two edgewise prediction paths for robot obstacle crossing and having an opposite direction are planned, and the edgewise prediction path with a minimum deviation degree relative to the navigation path is selected. Then, the robot starts a mode of walking along an edge, so as to cause the robot to walk according to the edgewise direction of the edgewise prediction path which is selected with the minimum deviation degree relative to the navigation path after colliding with the obstacle to achieve rapid obstacle crossing. In this embodiment, the edgewise prediction path with the minimum deviation degree relative to the navigation path is selected based on the foregoing steps as a shortest edgewise path, so that, after colliding with the obstacle, the robot can walk according to the edgewise direction of the shortest edgewise path to implement rapid obstacle crossing, the number of collisions of the robot during obstacle crossing is reduced, and the robot is prevented from deviating too far from the navigation path. Therefore, an efficient obstacle-crossing function of the robot along the edge can be realized, and the intelligence level of the robot can be improved.

As a preferred embodiment, all of the inflection points on the navigation path are numbered. A planned serial number of an initial point of the navigation path is 0. The following planned serial numbers increase sequentially. A planned serial number of the termination point of the navigation path remains the maximum. Specifically, the navigation path is formed by connecting a set of inflection points that are orderly distributed. In a navigation forward direction of the navigation path from the initial point to the termination point, the planned serial numbers of the arranged inflection points increase sequentially. Planned serial numbers of the preset inflection points satisfying the guide condition increase sequentially. The inflection points of which planned serial numbers are less than a planned serial number of the target inflection point are recorded as the inflection points traversed by the robot. Since the planned serial number of the final navigation target point is the greatest, the planned serial numbers corresponding to the inflection points that are closer to the final navigation target point in the navigation forward direction of the navigation path are greater. In this embodiment, all of the inflection points on the navigation path are sorted and distinguished by means of numbering, so that system software can conveniently identify and process the inflection points. Therefore, the selection of the preset inflection point satisfying the guide condition can be accelerated, and the speed of the robot to select the edgewise direction can be improved.

As a preferred embodiment, in step S102, selecting, on the navigation path which is preset, the preset inflection points satisfying the guide condition includes: selecting a target inflection point on the navigation path, and the target inflection point is an inflection point that has a guide effect and is selected when the robot collides the obstacle at the current position and starts an edgewise obstacle-crossing working mode (performing the edgewise path selection method), and when the current position of the robot is refreshed and changed, the target inflection point is also changed; and then judging whether the target inflection point and one or two of the inflection points successively arranged along a navigation forward direction of the navigation path from the target inflection point have the final navigation target point, to select the preset inflection point satisfying the guide condition. It is to be noted that, when the adjacent inflection point arranged along the navigation forward direction of the navigation path from the target inflection point is the final navigation target point, the termination point of the navigation path has been judged, so that continuous judgment is not needed. The navigation forward direction of the navigation path is a robot navigation direction for guiding the robot to move to the final navigation target point, and the final navigation target point is a termination point of the navigation path, and also belongs to one of the inflection points of the navigation path. In this embodiment, by determining whether three inflection points successively arranged on the navigation path have a termination point of the navigation path, the representative inflection point that can guide the robot to move to the final navigation target point is screened, and the difference between the navigation path and the edgewise prediction path can further be compared.

Specifically, when judging the two of the inflection points successively arranged along the navigation forward direction of the navigation path from the target inflection point do not have the final navigation target point, determining the preset inflection point satisfying the guide condition includes: a target inflection point selected from the navigation path, and the two of the inflection points successively arranged along the navigation forward direction of the navigation path from the target inflection point. The two of the inflection points that are successively arranged behind the target inflection point on the navigation path are arranged continuously. The planned serial numbers of the inflection points are sequentially increased and are greater than the planned serial number of the target inflection point. The target inflection point and the followed two inflection points are in front of the current position of the robot, so that an effect of guiding the robot to rapidly move to the final navigation target point can be achieved.

When judging the inflection point that is adjacent to the target inflection point and arranged along the navigation forward direction of the navigation path from the target inflection point is the final navigation target point, that is, when judging a first inflection point consecutively arranged along the navigation forward direction of the navigation path from the target inflection point is the final navigation target point, determining the preset inflection point satisfying the guide condition include: all of the inflection points that are arranged along the navigation forward direction of the navigation path from the target inflection point to the final navigation target point on the navigation path. In this case, all of the inflection points that are arranged along the navigation forward direction of the navigation path from the target inflection point to the final navigation target point only have the target inflection point and the final navigation target point. In this case, from the target inflection point, there is only the first inflection point arranged in the navigation forward direction of the navigation path, without the arranged second inflection point, because the first inflection point has been determined as the termination point.

When judging a second inflection point consecutively arranged along the navigation forward direction of the navigation path from the target inflection point is the final navigation target point, determining the preset inflection point satisfying the guide condition include: all of the inflection points that are arranged along the navigation forward direction of the navigation path from the target inflection point to the final navigation target point on the navigation path. In this case, there are three inflection points that are arranged along the navigation forward direction of the navigation path from the target inflection point to the final navigation target point, including the target inflection point, the final navigation target point, and an inflection point between the target inflection point and the final navigation target point on the navigation path.

It is to be noted that, the first inflection point is arranged adjacent to the target inflection point in the navigation forward direction of the navigation path. The second inflection point is also arranged adjacent to the first inflection point in the navigation forward direction of the navigation path.

When judging the target inflection point selected on the navigation path is the final navigation target point, determining the preset inflection point satisfying the guide condition has only the final navigation target point.

In conclusion, according to a determination result, the preset inflection point satisfying the guide condition and disclosed by this embodiment can represent a navigation direction feature of the navigation path, and influencing factors of the termination point of the navigation path are fully considered, so that a subsequent calculated quantity of the difference between the edgewise prediction path and the navigation path can be simplified.

Based on the above preferred embodiment, selecting the target inflection point on the navigation path which is preset specifically includes:

establishing an inflection point comparison area composed of grid coordinates that use the current position of the robot as a center and a maximum distance from the current position of the robot as a first preset distance threshold value;

when the inflection point comparison area only has one of the inflection point, selecting and recording the one of the inflection point as the target inflection point. In this way, a distance between the target inflection point and the current position of the robot is shortened, so that the subsequently edgewise prediction path which is selected is prevented from deviating too far from the navigation path. It is to be noted that, all of the inflection points of which planned serial numbers are less than the planned serial number of the target inflection point are designed as the inflection points that has been traversed by the robot.

When the inflection point comparison area has two or more than the two of the inflection points, in the inflection points with distances from the current position of the robot being less than the first preset distance threshold value, that is, in the inflection points of partial path of the navigation path that is covered by the inflection point comparison area, selecting and recording one inflection point that is closest to the final navigation target point in the navigation forward direction of the navigation path as the target inflection point. That is to say, the inflection point with the maximum planned serial number is selected as the target inflection point in front of the robot from the inflection points with distances from the current position of the robot being less than the first preset distance threshold value, so that the navigation speed to the final navigation target point is accelerated when the robot advances toward the target inflection point. It is to be noted that, all of the inflection points of which planned serial numbers are less than the planned serial number of the target inflection point are designed as the inflection points that has been traversed by the robot.

when the inflection point comparison area has none of the inflection points, along the navigation forward direction of the navigation path, selecting and recording one inflection point that is adjacent to the target inflection point recently marked by the robot on the navigation path as the target inflection point which is new; the target inflection point recently marked by the robot is a target inflection point that is selected and marked from the navigation path in a position that the robot collides with the obstacle latest. In this way, a marking position of the target inflection point plays a fundamental role in controlling the navigation of the robot to the termination point. Therefore, the robot is guided to move in a correct edgewise direction, and the subsequently edgewise prediction path which is selected is prevented from deviating too far from the navigation path. Therefore, in this embodiment, the selected target inflection point has the function of guiding the robot to move in the direction of the termination point of the navigation path in a local navigation area.

Preferably, when a distance between the current position of the robot and one of the inflection points is less than a second preset distance threshold value, determining the current position of the robot is coincide with the inflection point, which indicates that the robot has moved to an inflection point position of the navigation path. The second preset distance threshold value is less than the first preset distance threshold value.

Figure 2:
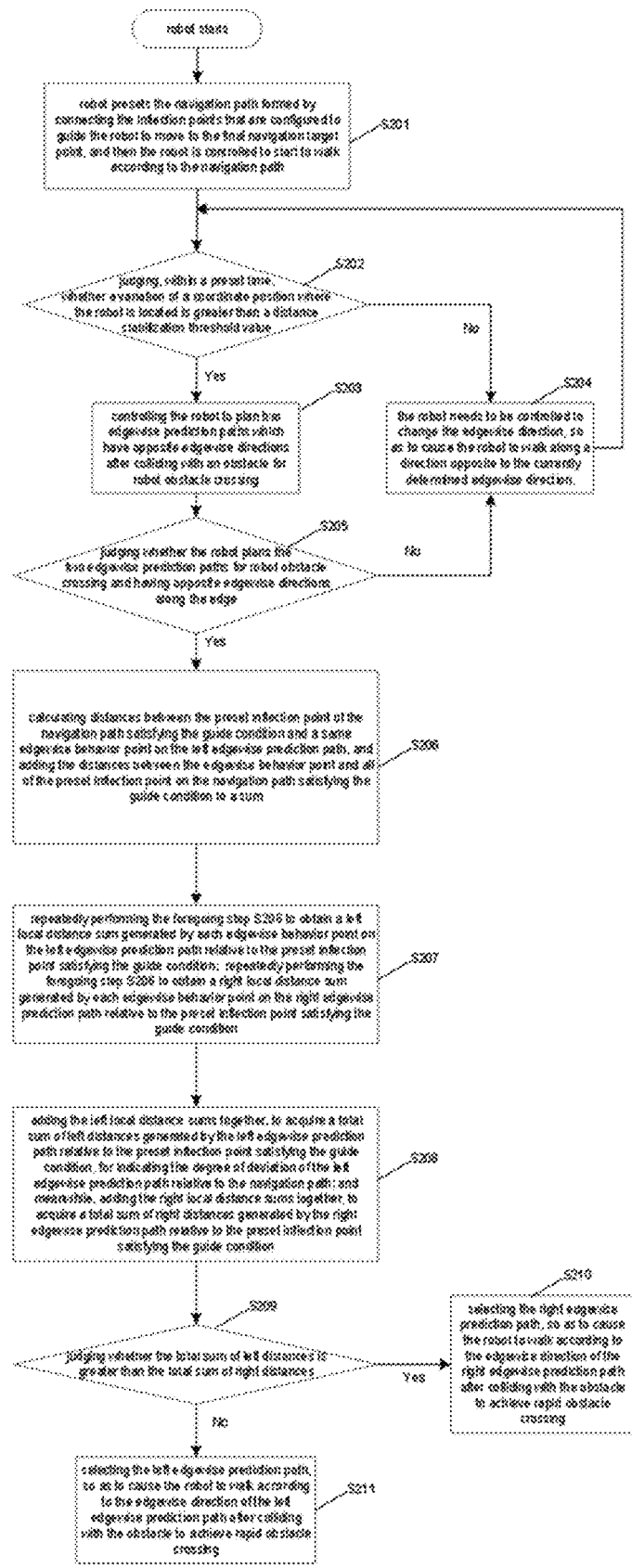
FIG. 2 is a flowchart of specific steps of an edgewise path selection method for robot obstacle crossing according to another embodiment of the disclosure.

Another embodiment of the disclosure discloses an edgewise path selection method for robot obstacle crossing. As shown in FIG. 2, the edgewise path selection method includes the following steps.

The robot is started. In this case, a robot system is powered on and started, and then step S201 is performed.

At step S201, the robot pre-calculated and set the navigation path formed by connecting the inflection points that are configured to guide the robot to move to the final navigation target point, and then the robot is controlled to start to walk according to the navigation path. In this embodiment, an initial edgewise direction of the robot is defaulted as a right edgewise direction. That is to say, after the robot collides with the obstacle in a default state, the robot can walk clockwise along the edge around the obstacle. Then step S202 is performed.

At step S202, judging, within a preset time, whether a variation of a coordinate position where the robot is located is greater than a distance stabilization threshold value, if so, step S203 is performed, otherwise, step S204 is performed. Step S202 is used for determining whether continuous and repeated walking along the edge occur at a same place during robot navigation or obstacle crossing along the edge. The distance stabilization threshold value is set to a diameter of a body of the robot.

At step S203, controlling the robot to plan two edgewise prediction paths for robot obstacle crossing, which are two type of edgewise prediction paths successively planned. Then step S205 is performed. In this embodiment, when the robot collides with a front obstacle, the edge of the obstacle is divided into a left side edge and a right side edge relative to the forward direction of the robot, so that a mode that the robot walks along the edge of the obstacle is classified into a left mode along the edge and a right mode along the edge. The robot under the left mode along the edge moves clockwise along the edge of the obstacle. The robot under the right mode along the edge moves counterclockwise along the edge of the obstacle. Therefore, the two edgewise prediction paths for robot obstacle crossing include a left edgewise prediction path and a right edgewise prediction path. An edgewise direction of the left edgewise prediction path is opposite to an edgewise direction of the right edgewise prediction path.

At step S204, the robot can be determined to be in a trapped state due to a plurality of collisions to the obstacle, the robot needs to be controlled to change the edgewise direction, so as to cause the robot to walk along a direction opposite to the currently determined edgewise direction. Specifically, when the variation of the coordinate position where the robot is located is determined to be less than or equal to the distance stabilization threshold value within preset time, it indicates that the robot can collide with the obstacle during movement according to the navigation path. Then the robot walks along the edge around the obstacle at the current position according to an edgewise direction of a default robot system. Alternatively, in a process that the robot walks around the obstacle according to the edgewise prediction path that is planned latest, the robot is trapped at the same position due to a plurality of collisions with the obstacle, resulting in current obstacle crossing failure. Therefore, the robot needs to be controlled to change the edgewise direction, and selects the direction opposite to the edgewise direction during collision. For example, the currently performed left mode along the edge is changed to the right mode along the edge. Alternatively, the currently performed right mode along the edge is changed to the left mode along the edge. In this way, the robot can walk along the direction opposite to the currently determined edgewise direction, so as to perform obstacle crossing walking more successfully.

It is to be noted that, during robot navigation, the robot first starts to walk along the edge by selecting the edge of the obstacle through collision. However, obstacle-crossing failure easily occurs due to the lack of correct edgewise direction, which causes the robot to walk along the edge farther and farther. Therefore, the robot is required to be controlled to perform step S203 and step S204 to accelerate obstacle crossing.

At step S205, judging whether the robot plans the two edgewise prediction paths for robot obstacle crossing and having opposite edgewise directions along the edge, if so, step S206 is performed, otherwise, step S204 is performed. Step S205 is used for judging whether the robot calculates the correct edgewise direction, to plan the edgewise prediction path that obstacle crossing is effectively performed by the robot. In this embodiment, the two edgewise prediction paths for robot obstacle crossing and having opposite edgewise directions along the edge respectively are the left edgewise prediction path and the right edgewise prediction path.

At step S206, calculating distances between the preset inflection point of the navigation path satisfying the guide condition and a same edgewise behavior point on the left edgewise prediction path, and adding the distances between the edgewise behavior point and all of the preset inflection point on the navigation path satisfying the guide condition to a sum, to obtain a left local distance sum generated by the edgewise behavior point relative to the preset inflection point satisfying the guide condition. The left edgewise prediction path is formed by connecting the edgewise behavior points. In addition, distances between the preset inflection point of the navigation path satisfying the guide condition and a same edgewise behavior point on the right edgewise prediction path are calculated, and then the distances between the edgewise behavior point and all of the preset inflection point on the navigation path satisfying the guide condition are added to a sum, to obtain a right local distance sum generated by the edgewise behavior point relative to the preset inflection point satisfying the guide condition. The left edgewise prediction path is formed by connecting the edgewise behavior points. Then, step S207 is performed.

At step S207, repeatedly performing the foregoing step S206 to obtain a left local distance sum generated by each edgewise behavior point on the left edgewise prediction path relative to the preset inflection point satisfying the guide condition; meanwhile, repeatedly performing the foregoing step S206 to obtain a right local distance sum generated by each edgewise behavior point on the right edgewise prediction path relative to the preset inflection point satisfying the guide condition; and then, step S208 is performed.

At step S208, adding the left local distance sums together, to acquire a total sum of left distances generated by the left edgewise prediction path relative to the preset inflection point satisfying the guide condition, for indicating the degree of deviation of the left edgewise prediction path relative to the navigation path; and meanwhile, adding the right local distance sums together, to acquire a total sum of right distances generated by the right edgewise prediction path relative to the preset inflection point satisfying the guide condition, for indicating the degree of deviation of the right edgewise prediction path relative to the navigation path. Then step S209 is performed.

At step S209, judging whether the total sum of left distances is greater than the total sum of right distances, if so step S210 is performed, otherwise, step S211 is performed. The smaller the total sum of right distances, the smaller the deviation of the right edgewise prediction path from the navigation path. The smaller the total sum of left distances, the smaller the deviation of the left edgewise prediction path from the navigation path.

At step S210, selecting the right edgewise prediction path, so as to cause the robot to walk according to the edgewise direction of the right edgewise prediction path after colliding with the obstacle to achieve rapid obstacle crossing. That is to say, when the total sum of left distances is greater than the total sum of right distances, the right edgewise prediction path is determined to be the edgewise prediction path with the minimum deviation degree relative to the navigation path, the right edgewise prediction path planned in step S203 is selected, so that the robot to walk according to the edgewise direction of the right edgewise prediction path after colliding with the obstacle to achieve rapid obstacle crossing. Therefore, the robot is prevented from excessively deviating from the navigation path which is preset during obstacle crossing.

At step S211, selecting the left edgewise prediction path, so as to cause the robot to walk according to the edgewise direction of the left edgewise prediction path after colliding with the obstacle to achieve rapid obstacle crossing. That is to say, when the total sum of right distances is greater than the total sum of left distances, the left edgewise prediction path is determined to be the edgewise prediction path with the minimum deviation degree relative to the navigation path, the left edgewise prediction path planned in step S203 is selected, so that the robot to walk according to the edgewise direction of the left edgewise prediction path after colliding with the obstacle to achieve rapid obstacle crossing. Therefore, the robot is prevented from excessively deviating from the navigation path which is preset during obstacle crossing.

During the performing of step S204, S210, and S211, the robot has walked along the edge, and walks along the edge of the obstacle. When an obstacle-crossing operation along the edge is performed, a position of the robot has been changed, so that it is required to update the current position of the robot in real time. Then step S202 is performed again, to continuously determine whether obstacle crossing fails during the walking of the robot along the edge.

According to the embodiment described in step S201 to step S211, by comparing a distance difference between the edgewise behavior point of the edgewise prediction path and a specific path node (the target inflection point and the inflection point arranged behind the target inflection point) in the navigation path, a difference between the edgewise prediction path and the navigation path is determined. Then, a reference edgewise direction of a candidate edgewise prediction path with a small difference is selected as an optimal direction for robot edgewise crossing. In this way, the robot is prevented from doing an invalid edgewise obstacle-crossing behavior because the edgewise prediction path cannot be planned, to cause the robot to walk farther and farther along a wrong edgewise direction.

In the foregoing embodiment, the basic conception of the method for planning the edgewise prediction path is a predictive path planning method, including the following steps.

At step S2031, after the robot collides with the obstacle, or after the robot collides with the obstacle in a current navigation position, marking a collision point on a grid map with pre-marked obstacle information, and then step S2032 is performed. When step S2031 is performed currently, the current marked collision point is to mark a grid corresponding to the obstacle on the map currently collided as the collision point. In this embodiment of the disclosure, a plurality of collision detectors can be arranged on the robot that walks along the edge. A certain collision strength value can be preset. Whether collision between the robot and the obstacle occurs can be determined when a collision strength of the collision detectors is greater than a threshold. Herein, the distinguishing on detection data of a plurality of detectors can be realized by means of the threshold. In this embodiment, when the robot detects the obstacle, the grid coordinate where the obstacle is located is calculated, and the grid corresponding to the obstacle on the map is marked as the obstacle point.

At step S2032, selecting grids meeting an edgewise obstacle-crossing condition on a neighborhood of the collision point currently marked in step S2031, and marking the grids which is selected as the edgewise behavior points configured on the edgewise prediction path for the robot to walk along an edge of the obstacle. That is to say, the grid meeting the edgewise obstacle-crossing condition forms a component of the planned edgewise prediction path after the robot collides with the obstacle. The edgewise behavior points form the two edgewise prediction paths for robot obstacle crossing and having opposite edgewise directions, including the left edgewise prediction path under a left robot start mode along the edge and a right robot start mode along the edge. The robot under the left mode along the edge moves clockwise along the edge of the obstacle. The robot under the right mode along the edge moves counterclockwise along the edge of the obstacle. In this way, when the robot starts walking along the edge, the two edgewise prediction paths for robot obstacle crossing and having opposite edgewise directions are planned. Therefore, in this embodiment, after the robot detects the collision of the obstacle, and before the robot starts walking along the edge, the grids having the edgewise obstacle-crossing condition are searched by means of the neighborhood of the currently marked collision point, so that the robot can walk along the edge according to an obstacle-crossing path planned by the corresponding grids. In this way, the number of collisions of the robot is reduced, and navigation is accelerated to cross the obstacle.

As an embodiment of the disclosure, a specific method of step S2032 includes the following steps. At step 21, the obstacle point of which distance relationship with the collision point currently marked in step S2031 meets a closest distance condition is searched, the currently marked collision point is the collision point marked on the grid map in step S2031 of the foregoing embodiment, and then step 22 is performed. At step 22, the grids meeting a pre-edgewise condition are selected on the neighborhood of the obstacle point searched in step 21, and then step 23 is performed. The neighborhood of the obstacle point is 8 grids surrounding the obstacle point. At step 23, when the number of the grids meeting the pre-edgewise condition is counted to reach a second preset grid number, a grid meeting an optimal edgewise condition is selected from the grids meeting the pre-edgewise condition as the grid meeting the edgewise obstacle-crossing condition, and then step 24 is performed. The grid meeting the edgewise obstacle-crossing condition is established based on the obstacle point meeting a closest distance condition and the grid meeting the optimal edgewise condition. That is to say, whether the grid meets the closest distance condition is determined first, and then whether correspondingly selected grid meets the optimal edgewise condition is determined based on this. At step 24, the grid meeting the optimal edgewise condition and selected in step 23 is recorded as a new collision point, the collision point is added as a newly planned edgewise behavior point on the corresponding edgewise prediction path for the walking of the robot along the edge of the obstacle, meanwhile, the new collision point is updated as the collision point currently marked in step S2031, and then step 21 is performed again, until the edgewise behavior points of a preset obstacle-crossing grid number are marked. The grid meeting the optimal edgewise condition is marked as a new collision point and saved in a set of the edgewise behavior points. A subsequent edgewise direction of the robot can be classified into a left edgewise direction and a right edgewise direction from a current position of the robot by means of the edgewise behavior points. The robot in the left edgewise direction moves clockwise along the edge of the obstacle. The robot in the right edgewise direction moves counterclockwise along the edge of the obstacle. Then, the robot walks along the edge of the obstacle according to the edgewise behavior points, so that the robot can cross the obstacle along a correct path and can rapidly get rid of a problem of collision with the obstacle. When the obstacle points meeting the closest distance condition are not searched out in step 21, it is determined that the left edgewise prediction path and/or the right edgewise prediction path cannot be planned. Alternatively, when the grids meeting the pre-edgewise condition are not searched out in step 22, it is determined that the left edgewise prediction path and/or the right edgewise prediction path cannot be planned.

Therefore, in this embodiment, by iteratively performing step 21 to step 24, within a reasonable number of the grids, the planned grids meeting the edgewise obstacle-crossing condition are marked as new collision point, so that the edgewise prediction path corresponding to the walking of the robot around the edge of the obstacle is planned. Therefore, the robot can predict a path along the edge by depending on the edges of the obstacles in the map.

In the above embodiment, in step 23, the grid meeting the optimal edgewise condition includes: a grid that is closest to the edge of the obstacle from a connecting line of a current position of the robot is selected from the grids meeting the pre-edgewise condition, that is, a grid of which an included angle between the connecting line of the grid selected in the step and the current position of the robot and a tangent line of a contour line of the obstacle currently colliding is minimum, or forming a grid of which included angle between the connecting line of the grid selected in the step and the current position of the robot and one coordinate axis of a robot coordinate system is minimum. Since an included angle between the connecting line of the grid meeting the optimal edgewise condition and the current position of the robot and the other coordinate axis of the robot coordinate system is maximum, the edgewise prediction path composed of the grids planned and determined in this embodiment can approach the contour line of the obstacle to the utmost extent. During the planning of the edgewise prediction path, the current position of the robot is unchanged.

In particular, when the counting number of the grids meeting the pre-edgewise condition reaches a second preset grid number, the grid that is closest to the edge of the obstacle from the connecting line of the current position of the robot is selected from the grids according to a relative position relationship between the grids meeting the pre-edgewise condition and the current position of the robot, to meet the edgewise obstacle-crossing condition. In this embodiment, on the premise of meeting a certain counting number, an edgewise prediction path with a reasonable length is planned, so that a calculation quantity of relative positions is reduced, and the processing efficiency of robot navigation obstacle crossing can be enhanced.

Generally, a method for calculating the relative position relationship between the grids meeting the pre-edgewise condition and the current position of the robot includes: establishing a robot coordinate system by using the current position of the robot as an original point, a right side direction of a body of the robot as an X-axis positive direction, and a current forward direction of the robot as a Y-axis positive direction. It is noted that the X-axis direction and the Y-axis direction of the coordinate system are not unique and fixed, but it is required to consider the positioning of the robot in the forward direction. In this embodiment, on the established robot coordinate system, a coordinate value and an angle value of each grid meeting the optimal edgewise condition are respectively calculated relative to an original point of the robot coordinate system. In this embodiment, in a world coordinate system XOY and the robot coordinate system X'O'Y', a center point (the current position of the robot) of the robot is an original point of the robot coordinate system. When a coordinate and angle of the robot in the world coordinate system are determined, the world coordinates of each collision point, obstacle point, and the edgewise behavior points relative to the current position of the robot can be converted by a formula for converting a machine coordinate into a world coordinate in the prior art. In this embodiment, by using a local coordinate system of the robot to participate in the coordinate calculation of the planned grids, the coordinate calculation of relevant grids is reasonable and accurate.

Preferably, the collision point includes a front collision point, a left collision point, and a right collision point. Considering costs, in this embodiment, two collision detectors are arranged on the robot. The detection capability of the two collision detectors can be identical. Since the collision detector needs to collide with the obstacle to realize the collision point detection of the obstacle, the collision detector needs to be arranged within a 180-degree angle range of a front half sector of a robot base. Herein, a sector surface can be divided into two equal parts, and the angle value of each part is 90 degrees. A left collision detector is disposed at a left front portion of the body of the robot. In this embodiment, the left collision detector is located at a midpoint of an arc line of a small sector on the left side of the body and configured to detect an obstacle collided on a left side of the forward direction of the robot. Specifically, the left collision detector is configured to detect the obstacle collided by the left side of the body when the robot walks along an edge counterclockwise along the edge of the obstacle, and a collision point on the obstacle in a corresponding direction is marked as a left collision point. A right collision detector is disposed at a right front portion of the body of the robot. In this embodiment, the right collision detector is located at a midpoint of an arc line of a small sector on the right side of the body and configured to detect an obstacle collided on a right side of the forward direction of the robot, so as to detect the obstacle collided by the right side of the body when the robot walks along an edge clockwise along the edge of the obstacle, and a collision point on the obstacle in the corresponding direction is marked as a right collision point. The left collision detector and the right collision detector are symmetrically disposed on the left and right sides of the body of the robot. Since the detection capability of the left collision detector and the right collision detector is identical, if a collision occurs at the junction of the two small sectors, the collision detectors at the two small sectors have a same collision intensity. That is to say, when a front side of the robot collides with the obstacle, the left collision detector and the right collision detector are triggered simultaneously, and the collision point on the obstacle in the corresponding direction is marked as the front collision point. In this way, the front collision point, the left collision point, and the right collision point marked by the robot are respectively located on the tangent line of the contour line of the obstacle with which the front side of the robot collides. The contour line of the obstacle is marked and formed on the grid map. Therefore, the robot can walk along the edge around different side edges of the same obstacle, and the robot is adapted to cross different obstacles in a manner of walking along the edge.

It is noted that, under the same robot coordinate system, if a map position where the center of the body of the robot is located is equivalent to the original point of the robot coordinate system, in this embodiment, the center of the body of the robot is regarded as the original point of the current position of the robot. In order to realize that the front collision point, the left collision point, and the right collision point marked by the robot at the same position are all located on the tangent line of the contour line of the obstacle with which the front side of the robot collides, when the robot collides with the obstacle at the original point position (0, 0), if a coordinate of the left collision point is recorded as (−2, 2), a coordinate of the right collision point is recorded as (2, 2), and a coordinate of the front collision point is recorded as (0, 2). Therefore, the robot is in the original point position (0, 0). When the robot detects that there is a collision at the coordinate (−2, 2) (the left collision point), it is determined that the obstacle is collided on the left side of the forward direction of the robot. When the robot detects that there is a collision at the coordinate (2, 2) (the right collision point), it is determined that the obstacle is collided on the right side of the forward direction of the robot. When the robot detects that there is a collision at the coordinate (0, 2) (the front collision point), it is determined that the obstacle is collided in the forward direction of the robot.

In addition, in this embodiment, according to the fact that the farther the collision point being from the collision detector, the smaller the collision intensity, it can be concluded that if the collision intensity in each small sector is measured by the collision detector in the sector, the intersection point between the various sectors is the collision point with the minimum collision intensity after the collision occurs, that is, the front collision point. To sum up, a collision strength threshold can be set to be less than the collision strength of the front collision point. According to the threshold, when the robot collides with the obstacle, only the collision intensity of the collision detector in a small sector is greater than the threshold, so that the robot identifies only one collision detector detecting the obstacle at a time. Therefore, the collision detector realizes the regional detection of obstacles in front of the robot, which facilitates the subsequent planning and determination of the edgewise direction. The magnitude of the threshold varies with the angle of the small sector. The angle of the small sector is related to the number of the collision detectors. Therefore, the collision intensity threshold needs to change with the number of collision detectors arranged on the robot.

As an embodiment, a method for selecting the grid that is closest to the edge of the obstacle from the connecting line of the current position of the robot from the grids according to the relative position relationship between the grids meeting the pre-edgewise condition and the current position of the robot includes the following operation.

When the collision point currently marked in step S2031 is the left collision point, a grid that meets the pre-edgewise condition, is distributed counterclockwise along the edge of the obstacle relative to the current position of the robot, and has a maximum angle value relative to the current position of the robot is selected as the grid meeting the optimal edgewise condition, and the connecting line between the grid and the current position of the robot is closest to the right side edge of the obstacle, so that the grids meeting the optimal edgewise condition are connected to form the right edgewise prediction path. On the whole, it is equivalent to the grid meeting the edgewise obstacle-crossing condition, so that the connecting line between the grid and the current position of the robot is closest to the edge of the obstacle, so as to determine a reference edgewise direction (an counterclockwise direction) of the robot for obstacle crossing along the edge. It is to be noted that, during the walking of the robot along the edge of the obstacle, there is a right edgewise behavior. The robot can move counterclockwise along the right side edge (contour line) of the obstacle. That is to say, the reference edgewise direction of the robot is determined to be the counterclockwise direction. Therefore, a grid that meets the pre-edgewise condition and is distributed counterclockwise along the edge of the obstacle relative to the current position of the robot is first determined and selected, so that the robot is controlled to successively traverse and select the grids meeting the optimal edgewise condition from the current position later, so as to move counterclockwise along the edge (contour line) of the obstacle. Then, based on this, by calculating the angle information of the grids meeting requirements, the grids meeting the pre-edgewise condition and with a maximum angle value (the included angle formed in the X-axis positive direction relative to the robot coordinate system established in the foregoing embodiment) are screened relative to the current position of the robot as the grids meeting the optimal edgewise condition. It is equivalent that in a second preset grid number of the grids meeting the pre-edgewise condition, the grids that the connecting line with the current position of the robot is closest to the edge of the obstacle are selected, so that the grids meeting the edgewise obstacle-crossing condition are acquired. Then, the robot during walking along the edge (contour line) moves counterclockwise along the edge of the obstacle according to the edgewise prediction path planned by the grids meeting the edgewise obstacle-crossing condition. After the robot crosses the edgewise behavior points of a certain grid number, the robot can cross the right side edge of the obstacle. It is to be noted that, the edgewise obstacle-crossing condition is required to be met while the closest distance condition and the pre-edgewise condition are met simultaneously.

Likewise, when the collision point currently marked in step S2031 is the right collision point, a grid that meets the pre-edgewise condition, is distributed clockwise around the edge of the obstacle relative to the current position of the robot, and has a minimum angle value relative to the current position of the robot is selected as the grid meeting the optimal edgewise condition, and the connecting line between the grid and the current position of the robot is closest to the left side edge of the obstacle, so that the grids meeting the optimal edgewise condition are planned to be the left edgewise prediction path. On the whole, it is equivalent to the grid meeting the edgewise obstacle-crossing condition, so that the connecting line between the grid and the current position of the robot is closest to the edge of the obstacle, so as to determine a reference edgewise direction (a clockwise direction) of the robot for obstacle crossing along the edge. It is to be noted that, during the walking of the robot along the edge of the obstacle, there is a left edgewise behavior. The robot moves clockwise along the left side edge (contour line) of the obstacle. That is to say, the reference edgewise direction of the robot is determined to be the clockwise direction. Therefore, a grid that meets the pre-edgewise condition and is distributed clockwise along the edge of the obstacle relative to the current position of the robot is first determined and selected, in a process that the robot then successively traverses the grids meeting the edgewise obstacle-crossing condition from the current position later, the robot is controlled to move clockwise along the edge (contour line) of the obstacle. Then, based on this, by calculating the angle information of the grids meeting requirements, the grids meeting the pre-edgewise condition and with a minimum angle value (the included angle formed in the X-axis positive direction relative to the robot coordinate system established in the foregoing embodiment, the X-axis positive direction points toward the right side of the same obstacle) are screened relative to the current position of the robot as the grids meeting the optimal edgewise condition. It is equivalent that in the second preset grid number of the grids meeting the pre-edgewise condition, the grids that the connecting line with the current position of the robot is closest to the edge of the obstacle are selected, so that the grids meeting the edgewise obstacle-crossing condition are acquired and marked as the edgewise behavior points. Then, the robot during walking along the edge moves clockwise along the edge (contour line) of the obstacle according to the edgewise prediction path planned by the edgewise behavior points. After the robot crosses the edgewise behavior points of a certain grid number, the robot can cross the left side edge of the obstacle. It is to be noted that, the edgewise obstacle-crossing condition is required to be met while the closest distance condition and the pre-edgewise condition are met simultaneously.

The angle of the grid meeting the edgewise obstacle-crossing condition relative to the current position (the center of the body of the robot) of the robot is a deflection angle of the connecting line of the grid meeting the edgewise obstacle-crossing condition relative to the current position (the center of the body of the robot) of the robot relative to the X-axis positive direction of the robot coordinate system. The magnitude of the deflection angle is related to an arrangement position of an X axis, especially the relationship between the X-axis positive direction and the distribution position of the obstacle. In this way, the connecting line between the selected grid meeting the edgewise obstacle-crossing condition and the current position of the robot is guaranteed to be closest to the edge of the obstacle, thereby planning the shortest edgewise prediction path.

Limited by a shape, an outline, and distribution position of the obstacle with which the robot currently collides, the smaller the connecting line of the grid meeting the edgewise obstacle-crossing condition relative to the current position (the center of the body of the robot) of the robot gets closer to the X-axis positive direction, the smaller the corresponding deflection angle, and vice versa, but it is required to ensure that the robot successfully crosses the obstacle by means of the edgewise obstacle-crossing condition without colliding with the obstacle frequently. In this embodiment, an edgewise prediction path that the robot crosses the obstacle according to an optimal angle direction is planned, the grids that support the robot to do clockwise or counterclockwise movement around the edge of the obstacle are planned. A walking path of the robot along the edge can be planned according to a shape feature of the obstacle. Therefore, the probability of the robot failing to cross the obstacle is reduced. According to the technical solution, by limiting an extreme value of the angle in the edgewise direction, the number of collisions of the robot during obstacle crossing can be effectively reduced, and the speed that the robot crosses the obstacle can be accelerated.

As an embodiment, planning the edgewise prediction path includes the following specific steps.

At step S401, after the robot collides with the obstacle, or after the robot collides with the obstacle in a current navigation position, defining a point that the robot collides with the obstacle as a collision value, and marking the collision point on a grid map with pre-marked obstacle information, and then step S402 is performed.

At step S402, establishing a first preset searching area by using the collision point currently marked in step S401 as a center and a first preset grid number as a radius, and the step S403 is performed. The first preset grid number is preferably 3 grids. Step S402 is used for searching all of the grids that are less than 3 grid lengths from the collision point currently marked in the step S401.

A distance comparison between the grids can be a distance comparison between grid coordinate points. Therefore, the robot is prevented from deviating too far from the obstacle during subsequent walking along the edge.

At step S403, searching an obstacle point that is closest to the collision point currently marked in step S401 and is not marked as the collision point in the first preset searching area as the obstacle point meeting the closest distance condition, and then step S404 is performed. It is to be noted that, before the edgewise behavior point is planned, the collision point currently marked in step S401 is a collision point that is marked by the robot on the grid map with pre-marked obstacle points by performing step S2031, and is the first collision point marked on the grid map with pre-marked obstacle points. The obstacle point selected in step S403 is configured to enclose an shape of an outline where the obstacle collides with the robot.

Preferably, when the obstacle points meeting the closest distance condition are not searched out in step S403, that the two edgewise prediction paths (the left edgewise prediction path and the right edgewise prediction path) for robot obstacle crossing and having the opposite edgewise direction cannot be planned is successively determined, and then step S204 is performed again. Therefore, edgewise obstacle crossing walking is continuously performed in the opposite edgewise direction.

At step S404, in a neighborhood of the obstacle points searched in step S403, selecting grids traversed and marked by the robot except for the obstacle points and planned edgewise grid points as the grids meeting the pre-edgewise condition. Then step S405 is performed. In a range of 8 grids of the neighborhood of the obstacle points searched in step S403, by searching the grids in addition to the obstacle points and the planned edgewise grid points in the grids traversed and marked by the robot, in an aspect, it is ensured that the robot is passable in the grids meeting the pre-edgewise condition. In another aspect, the robot is prevented from repeatedly walking in areas that have been planned with the edgewise prediction paths, so that the traversal repetition rate of the robot in a navigation area along the edge is reduced.

Preferably, when the grids meeting the pre-edgewise condition are not searched out in step S404, that the two edgewise prediction paths for robot obstacle crossing and having opposite edgewise directions along the edge cannot be planned is successively determined, and then step S204 is performed again. Therefore, edgewise obstacle crossing walking is continuously performed in a new edgewise direction.

At step S405, counting the number of the grids meeting the pre-edgewise condition in step S404, and when the grid meeting the pre-edgewise condition is counted, the relative position relationship between the grid meeting the pre-edgewise condition and the current position of the robot is calculated. Then step S406 is performed. In this way, the grids for guiding the robot to walk in a correct edgewise direction are conveniently screened later.

At step S406, when the counting number in step S405 reaches a second preset grid number, selecting the grid that is closest to the edge of the obstacle from the connecting line of the current position of the robot according to the relative position relationship between the grids meeting the pre-edgewise condition and the current position of the robot, to serve as the grid meeting the optimal edgewise condition, and then step S407 is performed. The grid meeting the optimal edgewise condition screened in step S406 is the grid meeting the edgewise obstacle-crossing condition, which is subsequently and directly configured to plan the edgewise prediction path with a reasonable length. Therefore, the calculation quantity of relative positions is reduced, and the processing efficiency of robot navigation obstacle crossing can be enhanced.

At step S407, marking the grid point selected in step S406 as a new collision point, and adding the grid point selected in step S406 to the edgewise prediction path corresponding to the walking of the robot along the edge of the obstacle, and marking the grid point selected in step S406 as a newly planned edgewise behavior point; the edgewise behavior point is saved in a memory of the edgewise prediction path inside the robot, and is configured to cause the robot to walk and traverse later, so as to cross the obstacle; meanwhile, the new collision point is updated as the collision point currently marked in step S401; and then, step S408 is performed.

At step S408, judging whether the edgewise behavior points of a preset obstacle-crossing grid number are marked, if so, the method for planning the edgewise prediction path is stopped, to cause the robot to walk along the edge to the planned edgewise behavior point, otherwise, step S402 is performed again, according to the foregoing steps, the updated collision point currently marked in step S401 is used to continuously select the grid meeting the edgewise obstacle-crossing condition, and the selected grid is marked as the newly planned edgewise behavior point on the edgewise prediction path configured to cause the robot to walk along the edge of the obstacle. Step S408 is used for determining whether the edgewise behavior points are fully stored in the memory of the edgewise prediction path inside the robot. From the current position of the robot, the edgewise behavior points of a preset obstacle-crossing grid number are sufficient to be planned into the edgewise prediction path crossing the obstacle collided at the current position. It is to be noted that, the selection and calculation of the above grids can be regarded as the selection and calculation of the corresponding grid coordinate points.

By performing the foregoing step S401 to step S408, when the collision point currently marked in step S401 is the right collision point, a grid that meets the pre-edgewise condition, is distributed clockwise along the edge of the obstacle relative to the current position of the robot, and has a minimum angle value relative to the current position of the robot is selected as the grid meeting the optimal edgewise condition, to cause the grid meeting the optimal edgewise condition to be planned as the left edgewise prediction path, so that the robot having the left edgewise behavior moves clockwise along the left side edge (contour line) of the obstacle. When the collision point currently marked in step S401 is the left collision point, a grid that meets the pre-edgewise condition, is distributed counterclockwise along the edge of the obstacle relative to the current position of the robot, and has a maximum angle value relative to the current position of the robot is selected as the grid meeting the optimal edgewise condition, to cause the grid meeting the optimal edgewise condition to be planned as the right edgewise prediction path, so that the robot having the right edgewise behavior moves counterclockwise along the right side edge (contour line) of the obstacle. Therefore, the two edgewise prediction path for robot obstacle crossing and having opposite edgewise directions respectively are a left edgewise prediction path and a right edgewise prediction path.

Figure 3:
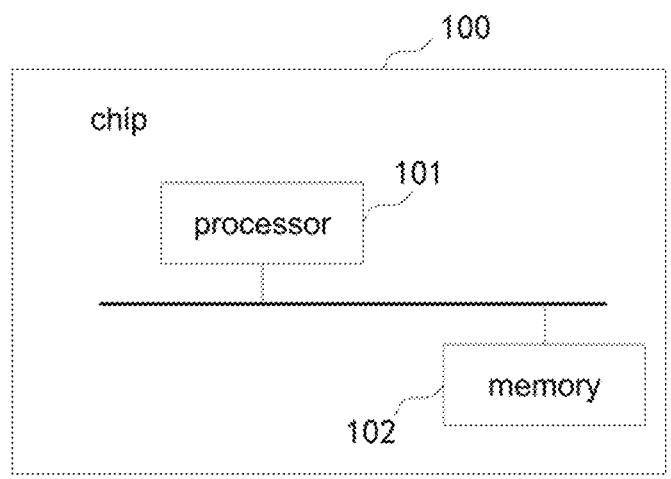
FIG. 3 is a schematic structural diagram of a chip according to embodiments of the present disclosure.

A chip stores a program code. When the program code is performed by the chip, the above edgewise path selection method is implemented. The logic and/or steps represented in flowcharts or otherwise described herein, for example, can be considered an ordered list of executable instructions for implementing the logical functions, can be embodied in any computer-readable media for use of an instruction execution system, apparatus or devices (such as a computer-based system, a system including a processor, or other system that can load and execute instructions from an instruction execution system, apparatus or apparatus) or with reference to such instruction execution systems, apparatus or devices. For the purposes of this specification, a "computer-readable medium" can be any device that can include, store, communicate, propagate, or transport the program for use by or in combination with the instruction execution system, apparatus, or devices. More specific examples (non-exhaustive list) of the computer-readable medium include the following: electrical connecting portions (electronic devices) including one or more wires, portable computer disk boxes (magnetic devices), random access memory (RAM), Read Only Memory (ROM), Erasable Editable Read Only Memory (EPROM or Flash Memory), fiber optic devices, and Compact Disc Read Only Memory (CDROM). In addition, the computer-readable medium can even be paper or other suitable medium on which the program can be printed, as it can be done, for example, by optically scanning the paper or other medium, followed by editing, interpretation or other suitable means if necessary process to obtain the program electronically and then store the program in a computer memory. As shown in FIG. 3, the chip 100 may include a processor 101 and a memory 102.

Figure 4:
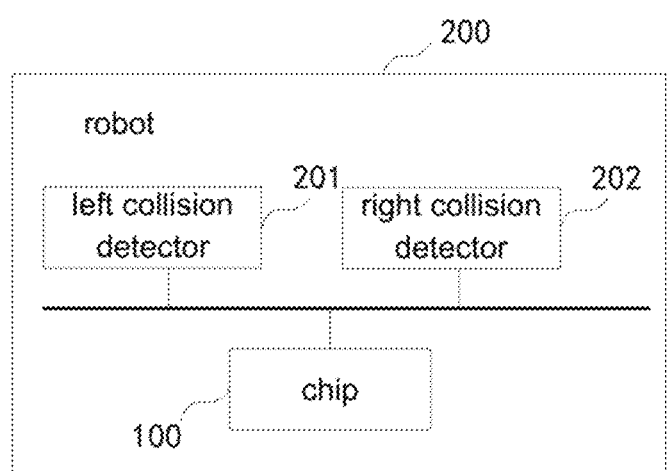
FIG. 4 is a schematic structural diagram of a robot according to embodiments of the present disclosure.

As shown in FIG. 4, a robot 200 is provided. A left collision detector 201 is disposed at a left front portion of a body of the robot 200 and configured to detect an obstacle collided on a left side of a forward direction of the robot, so as to detect the obstacle collided by the left side of the body when the robot walks counterclockwise along an edge of the obstacle. A right collision detector 202 is disposed at a right front portion of the body of the robot 200 and configured to detect an obstacle collided on a right side of the forward direction of the robot, so as to detect the obstacle collided by the right side of the body when the robot walks clockwise along an edge of the obstacle. The robot is provided with the chip 100. The chip 100 is connected to the left collision detector and the right collision detector. The robot is configured to perform the foregoing obstacle-crossing control method. Therefore, the problem that a visual robot is easy to collide with obstacles due to the inaccuracy of the visually marked obstacles can be alleviated, and the efficiency of robot obstacle crossing is improved. The left collision detector and the right collision detector are symmetrically disposed on the left and right sides of the body of the robot; when a front side of the robot collides with the obstacle, the left collision detector and the right collision detector are simultaneously triggered for detection, to cause the front collision point, the left collision point, and the right collision point of the robot marked in a same position to be located on a tangent line of a contour line of the obstacle collided with the front side of the robot; and the contour line of the obstacle is marked and formed on the grid map.

The above embodiments are merely for illustrating the technical concept and characteristics of the disclosure, and the purpose thereof is to enable those skilled in the art to understand the content of the disclosure and implement the content accordingly, and cannot limit the protection scope of the disclosure with this. All equivalent transformations or modifications made according to the spirit of the disclosure shall fall within the protection scope of the disclosure.

What is claimed is:

1. An edgewise path selection method for robot obstacle crossing, comprising:

first, planning an edgewise prediction path for the robot obstacle crossing, and selecting, on a navigation path which is preset, preset inflection points satisfying a guide condition, wherein the navigation path formed by connecting inflection points is preset for a robot, the robot is a visual sweeping robot; the inflection points are used for guiding the robot to move to a final navigation target point;

then according to information of distances between all of edgewise behavior points on each of the edgewise prediction path and the preset inflection points satisfying the guide condition on one same navigation path, selecting one edgewise prediction path having a minimum deviation degree relative to the navigation path, to cause the robot to walk in an edgewise direction of the edgewise prediction path which is selected after colliding with an obstacle, so as to achieve obstacle crossing, the edgewise path selection method for robot obstacle crossing further comprising:

after the robot starts walking according to the navigation path, judging, within a preset time, whether a variation of a coordinate position where the robot is located is greater than a distance stabilization threshold value, if the variation of the coordinate position where the robot is located is greater than the distance stabilization threshold value, controlling the robot to plan the edgewise prediction path, if the variation of the coordinate position where the robot is located is not greater than the distance stabilization threshold value, controlling the robot to change the edgewise direction, to cause the robot to walk in a direction opposite to the edgewise direction which is currently determined, the edgewise direction which is currently determined including a preset edgewise direction when the robot is powered on and an edgewise direction of the edgewise prediction path that is selected last time and has the minimum deviation degree relative to the navigation path; and controlling the robot to walk in the direction opposite to the edgewise direction which is currently determined if it is determined that two edgewise prediction paths which are used for the robot obstacle crossing and have opposite edgewise directions are unable to be planned, wherein the distance stabilization threshold value is set to a diameter of a body of the robot.

2. The edgewise path selection method for the robot obstacle crossing according to claim 1, wherein selecting, on the navigation path which is preset, the preset inflection points satisfying the guide condition comprises:

selecting a target inflection point on the navigation path, and then judging whether the target inflection point and one or two of the inflection points successively arranged along a navigation forward direction of the navigation path from the target inflection point have the final navigation target point, to select the preset inflection point satisfying the guide condition, wherein the navigation forward direction of the navigation path is a robot navigation direction for guiding the robot to move to the final navigation target point, and the final navigation target point is a termination point of the navigation path, and also belongs to one of the inflection points of the navigation path.

3. The edgewise path selection method for the robot obstacle crossing according to claim 2, wherein, when judging the two of the inflection points successively arranged along the navigation forward direction of the navigation path from the target inflection point do not have the final navigation target point, determining the preset inflection point satisfying the guide condition comprises: the target inflection point, and the two of the inflection points successively arranged along the navigation forward direction of the navigation path from the target inflection point on the navigation path;

when judging a first inflection point or a second inflection point successively arranged along the navigation forward direction of the navigation path from the target inflection point is the final navigation target point, determining the preset inflection point satisfying the guide condition comprises: all of the inflection points that are arranged along the navigation forward direction of the navigation path from the target inflection point to the final navigation target point on the navigation path; the target inflection point and the final navigation target point are also comprised; the first inflection point is adjacent to the target inflection point in the navigation forward direction of the navigation path, and the second inflection point is adjacent to the first inflection point in the navigation forward direction of the navigation path; and when judging the target inflection point selected on the navigation path is the final navigation target point, determining the preset inflection point satisfying the guide condition has only the final navigation target point.

4. The edgewise path selection method for the robot obstacle crossing according to claim 3, wherein selecting the target inflection point on the navigation path which is preset specifically comprises:

establishing an inflection point comparison area composed of grid coordinates that use the current position of the robot as a center and a maximum distance from the current position of the robot as a first preset distance threshold value;

when the inflection point comparison area only has one of the inflection point, selecting and recording the one of the inflection point as the target inflection point;

when the inflection point comparison area has two or more than the two of the inflection points, in the inflection points with distances from the current position of the robot being less than the first preset distance threshold value, selecting and recording one inflection point that is closest to the final navigation target point in the navigation forward direction of the navigation path as the target inflection point;

when the inflection point comparison area has none of the inflection points, along the navigation forward direction of the navigation path, selecting and recording one inflection point that is adjacent to the target inflection point recently marked by the robot on the navigation path as the target inflection point which is new; and when a distance between the current position of the robot and one of the inflection points is less than a second preset distance threshold value, determining the current position of the robot is coincide with the inflection point; and the second preset distance threshold value is less than the first preset distance threshold value.

5. The edgewise path selection method for the robot obstacle crossing according to claim 1, wherein according to the information of the distances between all of the edgewise behavior points on each of the edgewise prediction path and the preset inflection points satisfying the guide condition on the same navigation path, selecting the edgewise prediction path having the minimum deviation degree relative to the navigation path, to cause the robot to walk in the edgewise direction of the edgewise prediction path which is selected after colliding with the obstacle so as to achieve the obstacle crossing comprises:

the edgewise prediction path comprising a left edgewise prediction path and a right edgewise prediction path, and an edgewise direction of the left edgewise prediction path being opposite to an edgewise direction of the right edgewise prediction path;

calculating distances between the preset inflection points satisfying the guide condition of the navigation path and a same edgewise behavior point on the left edgewise prediction path, summing the distances to obtain a left local distance sum generated by the edgewise behavior point relative to the preset inflection points satisfying the guide condition; then repeating a foregoing calculation step to obtain left local distance sums generated by each of the edgewise behavior point relative to the preset inflection points satisfying the guide condition, and then adding the left local distance sums, to acquire a total sum of left distances generated by the left edgewise prediction path relative to the preset inflection points satisfying the guide condition, for indicating a deviation degree of the left edgewise prediction path relative to the navigation path;

meanwhile, calculating distances between the preset inflection points satisfying the guide condition of the navigation path and a same edgewise behavior point on the right edgewise prediction path, summing the distances to obtain a right local distance sum generated by the edgewise behavior point relative to the preset inflection points satisfying the guide condition; then repeating a foregoing calculation step to obtain right local distance sums generated by each of the edgewise behavior point relative to the preset inflection points satisfying the guide condition, and then adding the right local distance sums, to acquire a total sum of right distances generated by the right edgewise prediction path relative to the preset inflection points satisfying the guide condition, for indicating a deviation degree of the right edgewise prediction path relative to the navigation path;

when the total sum of the left distances is greater than the total sum of the right distances, determining that the right edgewise prediction path is the edgewise prediction path with the minimum deviation degree relative to the navigation path, and selecting the right edgewise prediction path, to cause the robot, after colliding with the obstacle, to walk according to the edgewise direction of the right edgewise prediction path which is selected to achieve the obstacle crossing; and when the total sum of the right distances is greater than the total sum of the left distances, determining that the left edgewise prediction path is the edgewise prediction path with the minimum deviation degree relative to the navigation path, and selecting the left edgewise prediction path, to cause the robot, after colliding with the obstacle, to walk according to the edgewise direction of the left edgewise prediction path which is selected to achieve the obstacle crossing, wherein, the smaller the total sum of the right distances, the smaller the deviation degree of the right edgewise prediction path relative to the navigation path; and the smaller the total sum of the left distances, the smaller the deviation degree of the left edgewise prediction path relative to the navigation path.

6. The edgewise path selection method for the robot obstacle crossing according to claim 4, wherein the navigation path is formed by connecting a set of the inflection points that are orderly distributed, and on the navigation path, planned serial numbers of the inflection points arranged along the navigation forward direction of the navigation path increase sequentially, wherein the planned serial numbers of the preset inflection points satisfying the guide condition increases sequentially, the inflection points of which the planned serial numbers are less than the planned serial number of the target inflection point is recorded as the inflection points which are traversed by the robot, wherein the planned serial number of the final navigation target point is the greatest, to cause the planned serial numbers corresponding to the inflection points that are closer to the final navigation target point in the navigation forward direction of the navigation path to be greater.

7. The edgewise path selection method for the robot obstacle crossing according to claim 1, wherein planning the edgewise prediction path comprises:

step 1, after the robot currently collides with the obstacle, marking a collision point on a grid map with pre-marked obstacle information;

step 2, selecting grids meeting an edgewise obstacle-crossing condition on a neighborhood of the collision point currently marked in the step 1, and marking the grids which is selected as the edgewise behavior points configured to cause the robot to walk along an edge of the obstacle, to cause the edgewise behavior points to form the edgewise prediction path.

8. The edgewise path selection method for the robot obstacle crossing according to claim 7, wherein the step 2 specifically comprises:

step 21, searching obstacle points of which distance relationship with the collision point currently marked in the step 1 meets a closest distance condition;

step 22, searching the grids meeting a pre-edgewise condition on a neighborhood of the obstacle points searched in the step 21;

step 23, when a number of the grids meeting the pre-edgewise condition is counted to reach a second preset grid number, selecting grids meeting an optimal edgewise condition from the grids meeting the pre-edgewise condition as the grids meeting the edgewise obstacle-crossing condition; and step 24, marking the grids meeting the optimal edgewise condition and selected in the step 23 as a new collision point, adding the new collision point as a edgewise behavior point which is newly planned on the edgewise prediction path correspondingly configured to cause the robot to walk along the edge of the obstacle, and meanwhile, updating the new collision point as the collision point currently marked in the step 1, and then returning to perform the step 21, until the edgewise behavior points of a preset obstacle-crossing grid number are marked, wherein when the obstacle points meeting the closest distance condition are not searched out in the step 21, it is determined that the edgewise prediction path is unable to be planned; alternatively, when the grids meeting the pre-edgewise condition are not searched out in the step 22, it is determined that the edgewise prediction path is unable to be planned.

9. The edgewise path selection method for the robot obstacle crossing according to claim 8, wherein, in the step 23, the grid meeting the optimal edgewise condition comprises:

a grid whose connecting line with a current position of the robot is closest to the edge of the obstacle is selected from the grids meeting the pre-edgewise condition; and in a process of performing the edgewise path selection method, the current position of the robot is unchanged.

10. The edgewise path selection method for the robot obstacle crossing according to claim 9, wherein the step 23 specifically comprises:

when a counting number of the grids meeting the pre-edgewise condition reaches the second preset grid number, selecting the grid whose connecting line with a current position of the robot is closest to the edge of the obstacle according to a relative position relationship between the grids meeting the pre-edgewise condition and the current position of the robot, to meet the edgewise obstacle-crossing condition.

11. The edgewise path selection method for the robot obstacle crossing according to claim 10, wherein calculating the relative position relationship between the grids meeting the pre-edgewise condition and the current position of the robot comprises:

establishing a robot coordinate system by the current position of the robot as an original point, a right side direction of the body of the robot as an X-axis positive direction, and a current forward direction of the robot as a Y-axis positive direction, wherein the current position of the robot is equivalent to a map position of a center of the body of the robot is located; and in the robot coordinate system, respectively calculating a coordinate value and an angle value of each of the grid meeting the optimal edgewise condition relative to the original point of the robot coordinate system.

12. The edgewise path selection method for the robot obstacle crossing according to claim 11, wherein the collision point comprises a front collision point, a left collision point, and a right collision point;
- a left collision detector is disposed at a left front portion of the body of the robot and configured to detect the obstacle collided on a left side of a forward direction of the robot, so as to detect the obstacle collided by the left side of the body when the robot walks counterclockwise along the edge of the obstacle, and mark a collision point on the obstacle in a corresponding direction as the left collision point;
- a right collision detector is disposed at a right front portion of the body of the robot and configured to detect the obstacle collided on a right side of the forward direction of the robot, so as to detect the obstacle collided by the right side of the body when the robot walks clockwise along the edge of the obstacle, and mark a collision point on the obstacle in the corresponding direction as the right collision point;
- the left collision detector and the right collision detector are symmetrically disposed on the left side and the right side of the body of the robot; when a front side of the robot collides with the obstacle, the left collision detector and the right collision detector are simultaneously triggered for detection, the collision point on the obstacle in a corresponding direction is marked as the front collision point, to cause the front collision point, the left collision point, and the right collision point of the robot marked in a same position to be located on a tangent line of a contour line of the obstacle collided with the front side of the robot; and the contour line of the obstacle is marked and formed on the grid map.

13. The edgewise path selection method for the robot obstacle crossing according to claim 12, wherein selecting the grid whose connecting line with the current position of the robot is closest to the edge of the obstacle according to the relative position relationship between the grids meeting the pre-edgewise condition and the current position of the robot comprises:
- when the collision point currently marked in the step 1 is the left collision point, selecting a grid that meets the pre-edgewise condition, is distributed counterclockwise along the edge of the obstacle relative to the current position of the robot, and has a maximum angle value relative to the current position of the robot as the grid meeting the optimal edgewise condition, to cause the grid meeting the optimal edgewise condition to be connected as the right edgewise prediction path, a reference edgewise direction of the robot along the edge being an counterclockwise direction; and
- when the collision point currently marked in the step 1 is the right collision point, selecting a grid that meets the pre-edgewise condition, is distributed clockwise along the edge of the obstacle relative to the current position of the robot, and has a minimum angle value relative to the current position of the robot as the grid meeting the optimal edgewise condition, to cause the grid meeting the optimal edgewise condition to be connected as the left edgewise prediction path, a reference edgewise direction of the robot along the edge being a clockwise direction.

14. The edgewise path selection method for the robot obstacle crossing according to claim 13, wherein, in the step 21, the obstacle points meeting the closest distance condition comprises: searching an obstacle point that is closest to the collision point currently marked in the step 1 in a first preset searching area and is not marked as the collision point, wherein the first preset searching area is a grid area that is established by the collision point currently marked in the step 1 as a center and a maximum distance from the collision point currently marked in the step 1 as a first preset grid number;
- before the step 24 is performed, the collision point currently marked in the step 1 is a first collision point that is marked by the robot on the grid map with pre-marked obstacle points by performing the step 1; and
- after the step 24 is performed, the collision point currently marked in the step 1 is a new collision point that is marked by the robot in the step 24 that is performed latest.

15. The edgewise path selection method for the robot obstacle crossing according to claim 14, wherein, between the step 22 and the step 23, the method further comprises:
- when the grid meeting the pre-edgewise condition is counted, calculating the relative position relationship between the grid meeting the pre-edgewise condition and the current position of the robot.

16. The edgewise path selection method for the robot obstacle crossing according to claim 15, wherein, in the step 22, the grid meeting the pre-edgewise condition comprises:
- among 8 grids in the neighborhood of the obstacle points searched in the step 21, selecting grids traversed and marked by the robot except for the obstacle points and the edgewise behavior points planned by the step 24.

17. A chip, having a program code stored thereon, wherein, when the program code is performed by the chip, the edgewise path selection method according to claim 1 is implemented.

18. A robot, wherein the robot is a visual sweeping robot, a left collision detector is disposed at a left front portion of a body of the robot and configured to detect an obstacle collided on a left side of a forward direction of the robot, so as to detect the obstacle collided by the left side of the body when the robot walks counterclockwise along an edge of the obstacle;
- a right collision detector is disposed at a right front portion of the body of the robot and configured to detect an obstacle collided on a right side of the forward direction of the robot, so as to detect the obstacle collided by the right side of the body when the robot walks clockwise along an edge of the obstacle; the robot is provided with the chip according to claim 17; the chip is connected to the left collision detector and the right collision detector; and the robot is configured to perform the edgewise path selection method according to claim 1.

19. The edgewise path selection method for the robot obstacle crossing according to claim 4, wherein according to the information of the distances between all of the edgewise behavior points on each of the edgewise prediction path and the preset inflection points satisfying the guide condition on the same navigation path, selecting the edgewise prediction path having the minimum deviation degree relative to the navigation path, to cause the robot to walk in the edgewise direction of the edgewise prediction path which is selected after colliding with the obstacle so as to achieve the obstacle crossing comprises:
- the edgewise prediction path comprising a left edgewise prediction path and a right edgewise prediction path, and an edgewise direction of the left edgewise prediction path being opposite to an edgewise direction of the right edgewise prediction path;
- calculating distances between the preset inflection points satisfying the guide condition of the navigation path and a same edgewise behavior point on the left edgewise prediction path, summing the distances to obtain a left local distance sum generated by the edgewise behavior point relative to the preset inflection points satisfying the guide condition; then repeating a foregoing calculation step to obtain left local distance sums generated by each of the edgewise behavior point relative to the preset inflection points satisfying the guide condition, and then adding the left local distance sums, to acquire a total sum of left distances generated by the left edgewise prediction path relative to the preset inflection points satisfying the guide condition, for indicating a deviation degree of the left edgewise prediction path relative to the navigation path;

meanwhile, calculating distances between the preset inflection points satisfying the guide condition of the navigation path and a same edgewise behavior point on the right edgewise prediction path, summing the distances to obtain a right local distance sum generated by the edgewise behavior point relative to the preset inflection points satisfying the guide condition; then repeating a foregoing calculation step to obtain right local distance sums generated by each of the edgewise behavior point relative to the preset inflection points satisfying the guide condition, and then adding the right local distance sums, to acquire a total sum of right distances generated by the right edgewise prediction path relative to the preset inflection points satisfying the guide condition, for indicating a deviation degree of the right edgewise prediction path relative to the navigation path;

when the total sum of the left distances is greater than the total sum of the right distances, determining that the right edgewise prediction path is the edgewise prediction path with the minimum deviation degree relative to the navigation path, and selecting the right edgewise prediction path, to cause the robot, after colliding with the obstacle, to walk according to the edgewise direction of the right edgewise prediction path which is selected to achieve the obstacle crossing; and when the total sum of the right distances is greater than the total sum of the left distances, determining that the left edgewise prediction path is the edgewise prediction path with the minimum deviation degree relative to the navigation path, and selecting the left edgewise prediction path, to cause the robot, after colliding with the obstacle, to walk according to the edgewise direction of the left edgewise prediction path which is selected to achieve the obstacle crossing, wherein, the smaller the total sum of the right distances, the smaller the deviation degree of the right edgewise prediction path relative to the navigation path; and the smaller the total sum of the left distances, the smaller the deviation degree of the left edgewise prediction path relative to the navigation path.

* * * * *